July 7, 1942.  H. G. GROEHN  2,289,262

DIE FIXTURE

Filed Aug. 23, 1940

INVENTOR
Harvey G. Groehn.
BY Dike, Calver & Gray.
ATTORNEYS.

Patented July 7, 1942

2,289,262

UNITED STATES PATENT OFFICE 2,289,262

DIE FIXTURE

Harvey G. Groehn, Trenton, Mich.

Application August 23, 1940, Serial No. 353,873

3 Claims. (Cl. 41—25)

This invention relates to an improved method of manufacturing duplicate master models for use in molding operations.

Heretofore it has been customary in the casting art to form a plurality of master models by the so-called Keller process whereby the desired shape of one model is transferred to another model by a copying process. This method of reproducing models is objectionable in that it is expensive and slow and does not reproduce the shape of the master pattern with a sufficient degree of accuracy to render the method practical for certain types of work.

The present invention contemplates an improvement in the art of making duplicate models whereby any desired number of master models of any desired degree of hardness may be readily formed by a casting or spraying operation in such a manner that the duplicate models accurately conform to the original master model both as to size and dimension. The duplicate models may be formed by casting a thin layer of a low melting alloy between the master model and a female plaster cast or by spraying a metal of a desired hardness on a wood master model or on a plaster cast which in turn may be formed from the master model.

An object of this invention is therefore to provide a novel method of forming duplicate master male and female models.

A further object of the invention resides in the provision of novel means whereby duplicate master models may be formed of a low melting alloy in such a manner as to provide duplicate models of any desired degree of surface hardness.

Yet a further object of the invention resides in the provision of economical duplicate master models which accurately conform to the shape of the master models because the surface of the duplicate models is formed of a relatively thin coating of a melted alloy or metal whereby the shrinkage due to contact with the master model is virtually eliminated because of the rapid cooling of the metal forming the model.

Another object is to provide a novel method of forming duplicate models of any desired degree of hardness by spraying alloy or metal coatings on master models or on duplicate master models by means of an oxyacetylene spray gun or other suitable device.

Other objects and advantages of this invention will appear in the following description and appended claims, reference being had to the accompanying drawing forming a part of this specification wherein like reference characters designate corresponding parts in the several views.

In the drawing wherein similar reference characters designate corresponding parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
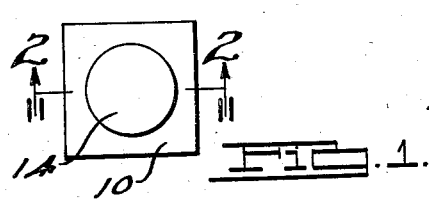
Fig. 1 is a plan view illustrating a master wooden model which it is desired to reproduce.
Figure 2:
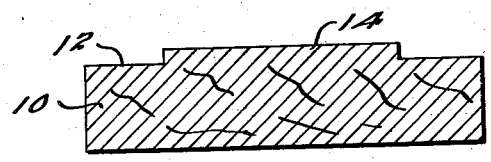
Fig. 2 is a sectional view taken substantially on the line 2—2 of Fig. 1.
Figure 3:
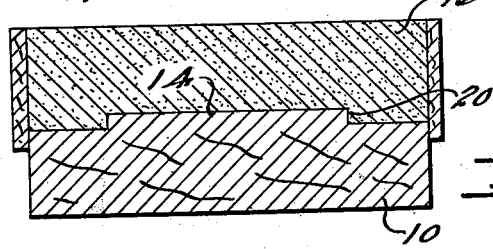
Fig. 3 is a sectional view illustrating one step in the performance of my improved method whereby a female master model formed of plaster of Paris or other suitable material may be applied to the master male model illustrated in Figs. 1 and 2.

Referring now to Figs. 1 and 2, it will be observed that a master male model shaped to conform to the desired shape of any object may be provided. By way of illustration, the master model 10 may be shaped to form an object having a substantially flat surface conforming to the substantially flat portions 12 of the model 10 and an embossed or raised section formed by the embossed or raised portion 14 of the model. It will of course be understood that models of any complexity may be formed by my improved method.

If the object which it is desired to make is relatively small and a particularly accurate finish is not required, a plaster of Paris cast 16 may be applied to the surface of the male master 10. The plaster cast 16 may be elevated a suitable distance from the surface of the master model 10 to provide a space therebetween to receive a thin layer of a molten alloy or metal 18 to form an accurate female model having a surface which accurately conforms to the surface of the master male model. It will be understood that the plaster cast 16 may be cut out at portions 20 to provide a space between the master model 10 and the plaster cast 16 to receive the low temperature alloy in the vertical planes. The space between the master model 10 and the plaster cast 16 need not be held to accurate limits.

Figure 4:
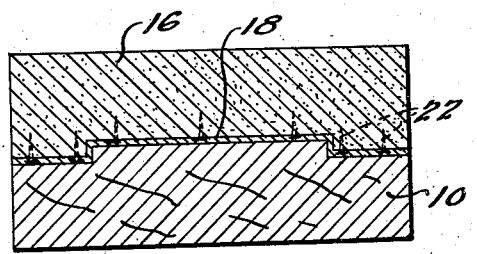
Fig. 4 is a view similar to Fig. 3 showing the next step in the operation whereby a thin layer of metal is poured between a master male model and a female plaster cast.

As illustrated in Fig. 4, the alloy or metal 18 may be fastened to the female plaster cast 16 by means of tacks 22 or other suitable attaching means.

When the alloy or metal 18 is poured between the male master model 10 and the female plaster cast 16 the space between the models may be relatively small so that the alloy will solidify rapidly and accurately conform to the shape of the surface of the master male model. Variations of dimensions due to shrinkage are thereby virtually eliminated.

Figure 5:
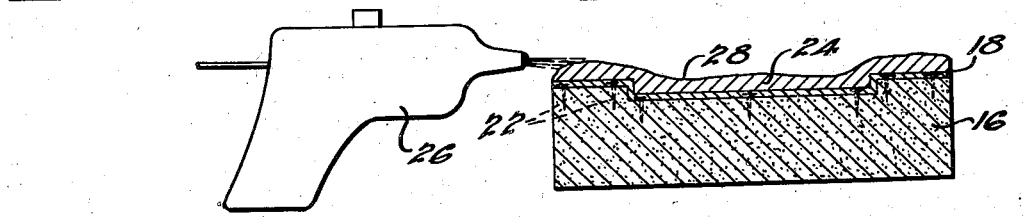
Fig. 5 is a diagrammatic view illustrating the formation of the duplicate male model by a spraying process.

The female plaster model 16 having the alloy or metal layer 18 attached thereto may then be removed from the master male model 10 and inverted as illustrated in Fig. 5. A duplicate male model accurately conforming to the shape and size of the original master male model 10 may then be formed from the female duplicate model by applying molten metal to the female surface of the alloy or metal surface 18. One desirable method of building up a duplicate male model 24 is to spray a thin layer of an alloy or metal having a suitable melting temperature to the surface 18 by means of an oxyacetylene spray gun 26. As the metal forming the duplicate male model 24 is applied to the female surface of the alloy or metal 18, it cools rapidly thereby accurately conforming to the shape of the female model whereby variations of size due to shrinkage are virtually eliminated.

Figure 6:
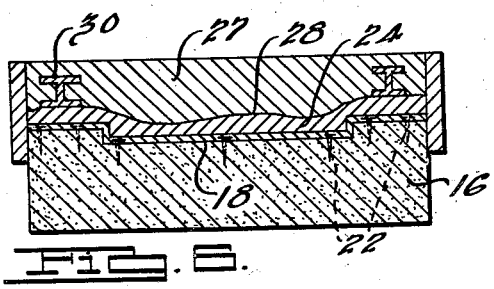
Fig. 6 is a sectional view illustrating one suitable method by which the duplicate male model may be built up by the use of chaplets and low temperature alloy to provide a suitable base for the surface of the duplicate model.

The back of the duplicate male model 24 may be built up by means of metal 27 applied to the outer surface 28 in any desired manner as by a casting, pouring or spraying operation, suitable chaplets 30 or other reinforcing or rigidifying members being provided to anchor the duplicate male model 24 to the metal 27. After the duplicate male model 24 of Fig. 6 has been completed it may be inverted and fastened to a support 32 formed of wood or other suitable material to support the duplicate male master for any use to which it is desired to place it.

Figure 7:
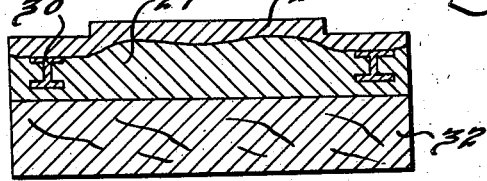
Fig. 7 is also a sectional view wherein the duplicate model is provided with a suitable reinforcing and carrying member of any suitable material.
Figure 8:
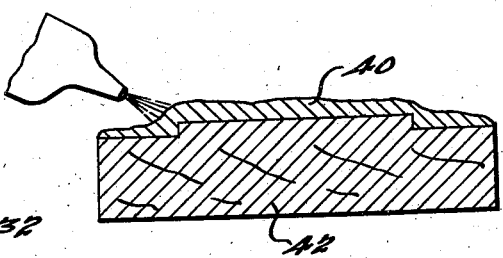
Fig. 8 is a sectional view illustrating the formation of a duplicate female model by the spraying of any suitable alloy or metal directly onto the surface of the male master.

Fig. 8 illustrates an embodiment of the invention wherein a female duplicate model 40 may be formed by spraying an alloy or metal directly to the surface of a master male wood model 42. It will be understood that the melting temperature of the alloy or metal employed to form the duplicate female model 40 is such as not to burn or score the male master wood model 42. When the duplicate model 40 has cooled it may be reinforced by applying thereto suitable reinforcing and backing members of any desired type, such for example as that illustrated in Figs. 6 and 7. The duplicate female model may then be removed from the male master model 42 and put into service.

The metals employed to form the surface of the duplicate male or female models may be chosen to assure that they possess the desired degree of hardness to withstand the wear to which the models are to be subjected in service. If a relatively soft surface is satisfactory, a low melting alloy of the Wood's metal group such as lead, tin, bismuth, cadmium, antimony or any combinations thereof in proper proportions will produce an alloy having the desired melting temperature. If the duplicate model will be subjected to a type of service where the surface must be harder than the surface of alloys of the Wood's metal group, the oxyacetylene gun may be employed to spray any desired metal such for example as iron, steel, brass, bronze, copper, etc. onto a surface having a sufficient degree of hardness to withstand the temperature of the molten metal which is used in the oxyacetylene gun. For example, the duplicate female model 40 illustrated in Fig. 8 may be employed to form a duplicate male model of a harder metal than the metal 40. If necessary several transfers of this nature may be resorted to to build up a male or female duplicate model having the desired degree of hardness and accuracy.

In view of the fact that as previously pointed out the metal applied cools rapidly on contact with the model, there is virtually no shrinkage whereby accurate models may be quickly and economically formed.

In the formation of models by the method illustrated in Figs. 3 to 6, it is contemplated that an allow of the Wood's metal group will be used in the step illustrated in Fig. 4 wherein a thin surface of the alloy is poured between the surfaces of the wood male master model 10 and the female plaster model 16. In Fig. 5 one of the harder, higher melting metals may be applied to the female surface with the oxyacetylene gun to produce a duplicate male model having a desired degree of hardness.

This method of duplicating master wood models into a metal form which has the accuracy, size and shape of the original, expedites the delivery and reduces the cost of making or manufacturing dies for sheet metal stampings in any field. The master female models and the master male models may be employed on Keller engraving machines and for spotting and checking. This method of forming duplicate models may also be employed to form duplicate male models which may be used as master checking fixtures for checking production stampings as for the location of holes, trim lines, flange lines, shapes, contours, etc.

The steps involved in the duplication of a female or a male master model naturally are governed by the use to which the female or male master duplicates will be put. In other words, plaster may be eliminated and only the spray gun method used depending upon the size and shape of the model desired to be reproduced.

The material used to form the backing or base of a female duplicate or of a male duplicate model may depend upon the use to which the duplicate is to be put and may be formed of any desired material such for example as wood, steel, iron, concrete or other similar material. Some of the common uses to which such duplicate models are put which have a bearing on the material of which the base should be formed are as Keller models, spotting models, master checking fixtures for checking stampings or other miscellaneous uses in tool and die construction.

One of the advantages of the duplicate models is the fact that one manufacturer instead of merely having one master model to work from can make three or four duplicates of his original model whether it be fenders, roofs, doors or any other model of a sheet metal stamping, and use his original in his own plant, place one duplicate out for patterns and other miscellaneous preparatory work, use one for the construction of dies, Kellering, spotting, etc. This naturally eliminates the necessity of moving the original model about and at the same time provides an accurate duplicate model at all phases of construction where they are desirable. The stampings formed are therefore more accurate and they can be made more economically.

This method of spraying any alloy or metal and duplicating a master model may also be applied in the formation of inexpensive low production stamping dies such as are used for certain airplane stampings and for other uses where low production is contemplated. These low production stampings heretofore were made from dies constructed of lead, rubber, wood, and other relatively soft materials and the dies therefore have a production limit lower than dies constructed with the oxygen-acetylene spray method of duplicating punches and pads.

It will be apparent that this invention eliminates Kellering, barbering or chipping, filing and the making of many steel templates, as is common practice at present.

I claim:

1. The method of forming master models which comprises applying a hardenable substance to the working face of an original master model, separating said substance from the working face of the master model whereby a free space having large surface area per unit of volume is interposed between the working face of the master model and said substance, introducing molten alloy into the free space, separating said substance and alloy from the working face of the master model, applying molten material to the alloy face separated from the working face of the master model to form a working face of a duplicate master model accurately conforming to the contour of the original master model, and reinforcing the duplicate master model by the application of an adherent mass of metal to the material forming the non-working face of the duplicate master model to build up a reinforced body member.

2. That method of forming a duplicate model from a master model having a working surface formed to the outside of metal which comprises superimposing on the master model a member having a surface terminating adjacent the working surface of the master model whereby a relatively thin free space having large surface area per unit of volume lies between the working surface of the master model and the surface of said member, introducing retaining means into the surface of said member positioned to lie adjacent the working surface of the master model in such a manner that the retaining means projects into the space between the surface of the member and the working surface of the master model, masking off the space between the member and the master model, completing a duplicate model by casting into the masked off space an alloy having such low melting point that it will fill the space between the surface of the member and the working surface of the master model without injuring said surfaces and engage the retaining means and solidify with negligible shrinkage because of the rapid chilling caused by the large surface area per unit of volume between said member and the master model thereby providing a duplicate model having a working surface accurately conforming to the contour of the master model, spraying liquid metal onto the working surface of the duplicate model to form the working surface of a second duplicate model accurately conforming to the contour and dimensions of the original master model, and completing the second duplicate model by applying to its non-working surface a mass of adherent metal.

3. That method of forming duplicate master models which comprises applying a thin layer of a liquefied alloy to the working face of an original master model in such a manner that the master model is not subjected to sufficient heat to burn its working surface, and reinforcing said layer of alloy by applying to its non-working surface defined as being the surface which does not engage the working surface of the master model a mass of adherent material of sufficient quantity to build up a reinforced body member, applying to said alloy working face a thin layer of a liquefied alloy in such a manner that said alloy working face is not subjected to sufficient heat to burn it, and reinforcing said last applied alloy working face by applying to its non-working surface a mass of adherent material to build up a reinforced duplicate model accurately conforming to the original master model.

HARVEY G. GROEHN.